Dec. 14, 1926.
E. L. DELANY
THREADED CONNECTING MEMBER
Filed March 6, 1925
1,610,934
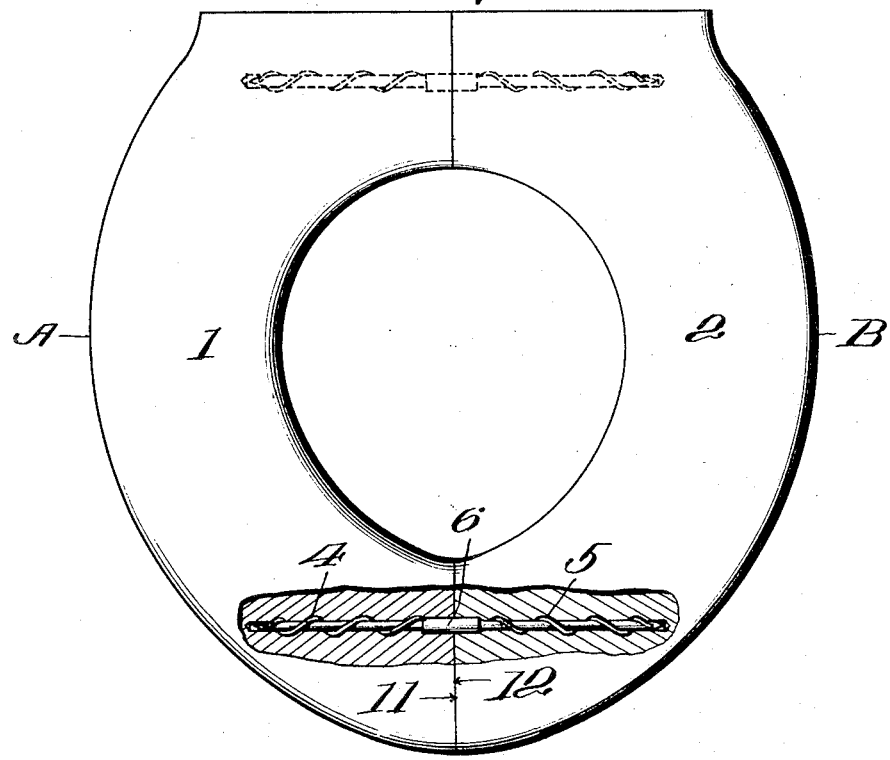
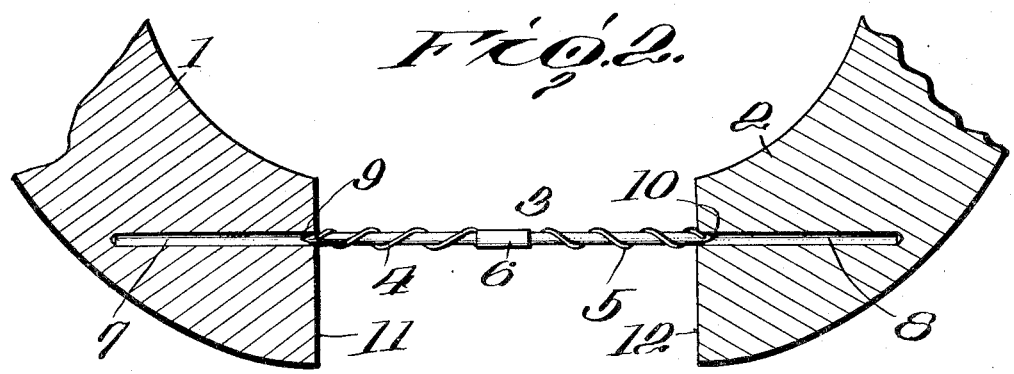

Patented Dec. 14, 1926.

1,610,934

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

THREADED CONNECTING MEMBER.

Application filed March 6, 1925. Serial No. 13,646.

My invention relates to improvements in threaded connecting members.

The object of my invention is to provide a threaded connecting member so constructed to connect two wooden members together so that the same is wholly embedded within the members to be connected out of sight, so that a perfect joint is made having the appearance of one piece, and the members are particularly adapted and designed for connecting the two pieces of a toilet seat together.

Another object of my invention is to provide a threaded member of this character which is applied by pressure on the two members to be secured together, and thus dispensed with labor in screwing the members together, and insure of the members being drawn up evenly at the same time, so that the faces and edges of the members will be flush, and a tight joint formed.

A further object of my invention is to provide a simple, cheap and effective threaded member of this character which will more readily enter the members to be connected, and yet provide sufficient holding means to hold the members together and thus there is a great saving of time and labor in securing the two members together.

In the accompanying drawings:—

Figure 1 is a top plan view of two sections of a toilet seat connected by my improved threaded member, and partly broken away.

Figure 2 is a sectional view showing the first step of the application of the connecting member.

Referring now to the drawings, 1 represents one section of the seat and 2 the other section, which are adapted to be connected by my improved threaded connecting member, and while I have shown this in the form of a toilet seat it will be understood that the same could be used for connecting two pieces of wood together, in constructing any desired article. The threaded connecting member 3 comprises an elongated body portion, having raised thereon the right hand threaded portion 4 at one end, and the left hand threaded portion 5 at the opposite end, extending to the ends of the threaded member, and having a blank space 6 at the inner ends of the threads. This blank space is of a diameter slightly greater than the body portion opposite the threads, as will be hereinafter more fully described.

The threaded portions 4 and 5, as herebefore stated, are raised on the body portion so that the body portion has a smooth cylindrical surface which engages the walls of the openings as will be later described. In connecting the two sections 1 and 2 of the toilet seat together, the edges thereof are first bored with the openings 7 and 8, which are of diameters nearly equal to the cylindrical body portion of the threaded member opposite the threads. These bored openings 7 and 8 are also of a diameter little less than the central enlarged portion 6 of the threaded member.

In the application of a device for joining the two sections of a seat together the pointed ends 9 and 10 are placed in the openings 7 and 8 of the seat sections, and pressure is applied inwardly to the outer edges of the sections 1 and 2, at the points A and B. This pressure causes the threaded members to rotate and travel inwardly cutting their own threads in the openings 7 and 8, and thus tightly drawing the two sections together, until their abutting edges 11 and 12 tightly engage each other. The central enlarged portion 6, will be drawn into the outer ends of the openings, and being larger than the openings, will tightly engage the walls thereof to prevent any lateral or transverse movement at a point on each side of the line of connection of the two seat sections. It will also be seen that the body portion of the threaded member opposite the threads will tightly engage the walls of the openings 7 and 8 and thus a rigid connection is produced.

In the drawings I have shown the application of my threaded member to a toilet seat, yet it will be understood that the same can be used for connecting any two pieces of wood together, as I do not care to limit myself to a toilet seat.

Having thus fully described my invention what I claim is:—

1. A threaded connecting member comprising a body portion having right and left hand coarse wood threaded portions, and each threaded portion having threads of such a pitch that the connecting member is caused to rotate and cut its own threads by pressure applied to the members to be connected, and said body portion having a smooth portion between the ends of the threaded portions and of a diameter slightly greater than that of the body portion.

2. A threaded connecting member comprising a body portion having right and left hand coarse wood threaded portions, and each threaded portion having threads of such a pitch that the connecting member is caused to rotate and cut its own threads by pressure applied to the members to be connected, and said body portion having a circular smooth portion between the inner ends of the threaded portion and of a diameter slightly greater than that of the body portion.

3. A threaded connecting member comprising a body portion having right and left hand coarse wood threaded portions and each threaded portion having threads of such a pitch that the connecting member is caused to rotate and cut its own threads by pressure applied to the members to be connected, and said body portion having a circular smooth portion between the inner ends of the threaded portion, and of a diameter slightly greater than that of the body portion and slightly less than the diameter of the threads.

In testimony whereof I affix my signature.

EDWARD L. DELANY.